United States Patent
Graham

Patent Number: 5,116,282
Date of Patent: May 26, 1992

[54] VARIABLE CIRCUMFERENCE ADJUSTABLE-DRIVE PULLEY MECHANISM

[76] Inventor: James A. Graham, 3712 N. Broadway, Chicago, Ill. 60613

[21] Appl. No.: 760,188

[22] Filed: Sep. 16, 1991

Related U.S. Application Data

[63] Continuation-in-part of Ser. No. 597,318, Oct. 15, 1990, Pat. No. 5,049,113.

[51] Int. Cl.5 .................... F16H 55/00; F16H 7/08
[52] U.S. Cl. ........................... 474/49; 474/101
[58] Field of Search ............... 474/12, 13, 16, 17, 474/49, 101, 111; 180/230, 338

[56] References Cited

U.S. PATENT DOCUMENTS

| | | | |
|---|---|---|---|
| 3,747,721 | 7/1973 | Hoff | 474/13 X |
| 4,179,946 | 12/1979 | Kanstoroom | 474/16 |
| 4,992,066 | 2/1991 | Watson | 474/111 X |
| 5,049,113 | 9/1991 | Graham, Jr. | 474/49 |

*Primary Examiner*—Thuy M. Bui
*Attorney, Agent, or Firm*—Jerome J. Norris

[57] ABSTRACT

A variable inverted pulley mechanism supported by an external mechanisms that located the pulley halves. Power transfer takes place via either a combination of a variable pulley located inside the variable inverted pulley, working together with fixed planet wheels, or with innovative variable span planet mechanisms working together with a traditional sun wheel or a variable pulley in place of a traditional sun.

3 Claims, 3 Drawing Sheets

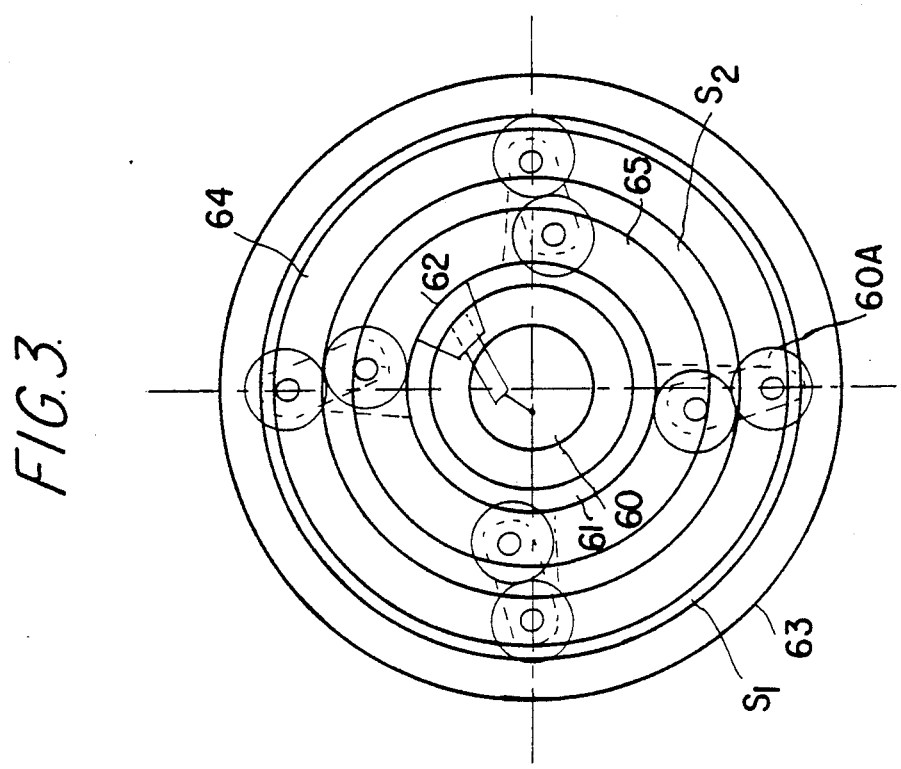

VARIABLE CIRCUMFERENCE ADJUSTABLE-DRIVE PULLEY MECHANISM

BACKGROUND OF THE INVENTION

1. Field of the Invention

The invention pertains to an adjustable-speed drive mechanism for imparting and receiving rotational force, wherein said mechanism comprises a variable diameter pulley assembly and a flexible belt or chain wrapped around the axle of the pulley, that serves as a gripping surface. The application is a continuation-in-part of U.S. patent application Ser. No. 07/497,318, filed on Oct. 15, 1990, now U.S. Pat. No. 5,049,113.

2. The prior Art

Variable diameter pulley systems have long been used in the mechanical transmission art, and are well known as inexpensive, but highly efficient means to derive infinitely variable output speeds from a constant power source, or means to cause an increase or a decrease in torque from a variable power source.

For example, in U.S. Pat. No. 4,179,946 there is disclosed a variable diameter, centrifugally responsive, tension operated pulley, which when used in combination with a substantially similar pulley and belt, provides a controlled-speed variable ratio accessory drive.

An automatic transmission for small motorized vehicles is disclosed in U.S. Pat. No. 3,747,721, and incorporates variable diameter pulleys, whereby drive ratios can easily be changed between upper and lower limits.

The Jun. 1989 issue of *Machine Design* magazine presents an overview of variable speed transmissions in an article entitled "Mechanical Adjustable-Speed Drives." This magazine indicates that the efficiency of a variable diameter pulley system is usually about 95%, and that such systems provide good overload and jam protection due to favorable slips (i.e., the belts provide good overload and jam protection because the belt slips when overloaded).

However, despite the aforementioned advantages, variable diameter pulleys are known to be critically limited in relation to other types of mechanical transmissions insofar as the amount of useful power which can be handled due to the natural torque limitations of the belt and pulley combination itself.

Accordingly, a need exist in the mechanical transmission art, for a reliable method of increasing the torque handling capability of a variable diameter pulley.

With all current belt and pulley systems, contact between the belt and the pulley occurs on the side of the belt. Because of the small thickness of the belt necessary for belt flexibility, the contact area is small. In addition, the power transfer occurs by friction because the variable diameter prevents installing gear teeth or other positive engaging mechanisms on the side of the pulley. In this connection, it should be noted that some variable pulleys have ribs on the contact surfaces; however, the ribs and/or their spacing increases with increasing distance from the axis of the pulley half. Such systems can provide for a non-slip engagement, but only for very limited power, since the changing spacing on the pulley halves is incompatible with the fixed spacing on the belt.

SUMMARY OF THE INVENTION

One object of the present invention is to provide an inverted variable pulley mechanism for power transmission internal to variable pulley mechanism.

A further object of the present invention is to provide a variable diameter inverted pulley assembly that incorporates on external storage area capable of receiving and storing a flexible surface therein.

A yet further object of the present invention is to provide a variable planetary mechanism consisting of a variable mechanism for a variable sun gear and/or a variable inverted circumference mechanism for a variable ring gear and/or variable-span gear assembled for the planet gear.

In general, the invention is attained by providing a variable diameter pulley that is supported by a hollow spindle that is used in conjunction with a flexible surface in a manner such that the surface effectively increases the tractional forces of the pulley. The pulley can serve as either a driving member or as a driven member. The surface encircles the axle of the pulley and is held tightly thereto by a novel storage compartment in the hub of the pulley, thereby eliminating any slackness in the surface as the pulley halves move outwardly from one another.

In this assemblage, one end of the surface is permanently attached to an outer edge of the axle, while the other end of the surface is fastened to a tensioning means inside the axle. One possible tensioning means comprises cables connected to each of the pulley halves cooperatively. As the pulley halves move toward one another axially, the surface is automatically urged out of the storage compartment located in the hub, to allow the surface to smoothly ride-up the sides of each pulley half to achieve an outer diameter that is gauged to suit the increased working diameter of the pulley. Conversely, as the pulley halves move outwardly, the surface is recalled and stored in the hub, thereby assuming an effective circumference commensurate with the now decreased working diameter of the pulley.

With this arrangement, contact between the pulley and the transfer mechanism (belt, chain, gear, or equivalent) occurs primarily at the engaging surface, and can occur secondarily on the sides of the pulley above the engaging surface if a belt is used. The engaging surface inherently provides a larger contact area than the belt sides for a normal variable pulley, and can be widened as necessary to transmit any amount of power. The engaging surface can have "V" grooves running along its length for use with multi-ribbed belts or multiple belts for additional power. Conversely, the engaging surface can be equipped with gear teeth for positive engagement instead of friction engagement. Gears or toothed belts can be used for high power non-slip power transfer.

BRIEF DESCRIPTION OF THE DRAWINGS

FIG. 3 depicts a side view of FIG. 2.

DETAILED DESCRIPTION OF THE INVENTION

Figure 1:
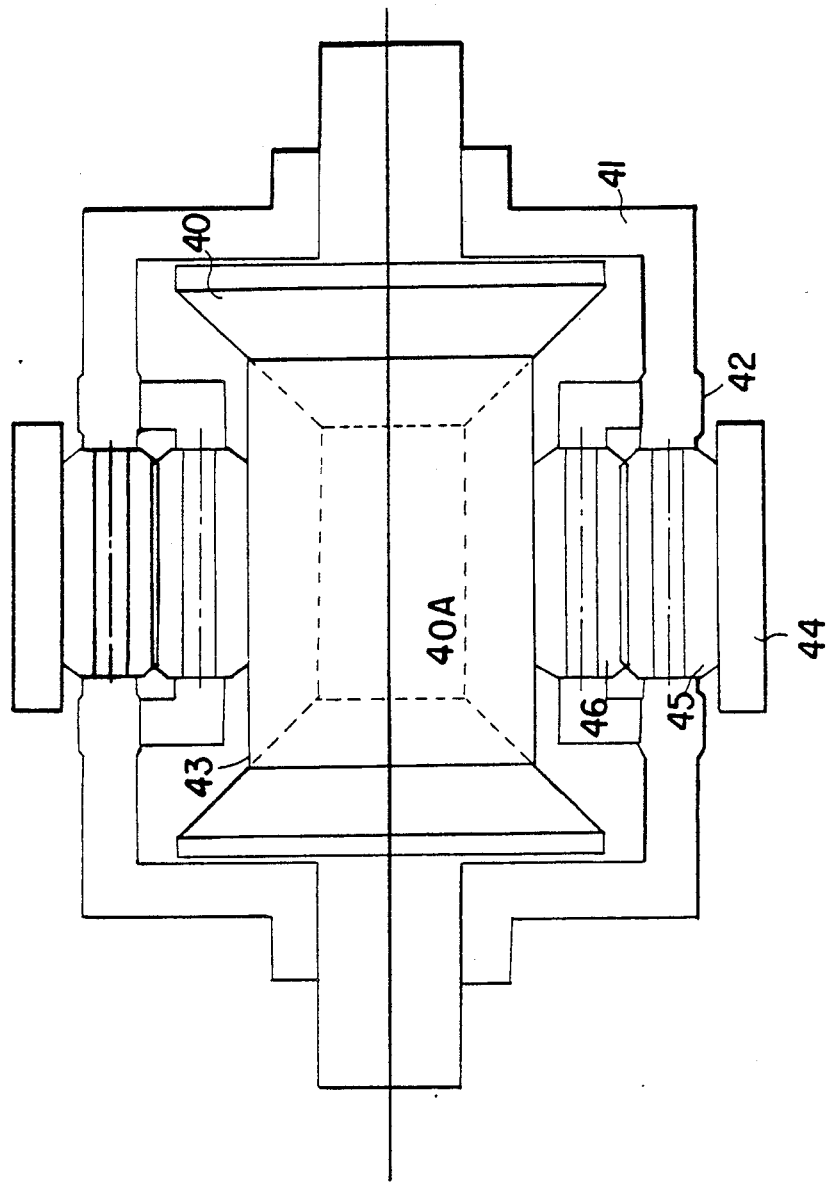
FIG. 1 depicts a front view of a variable planetary gear.
Figure 2:
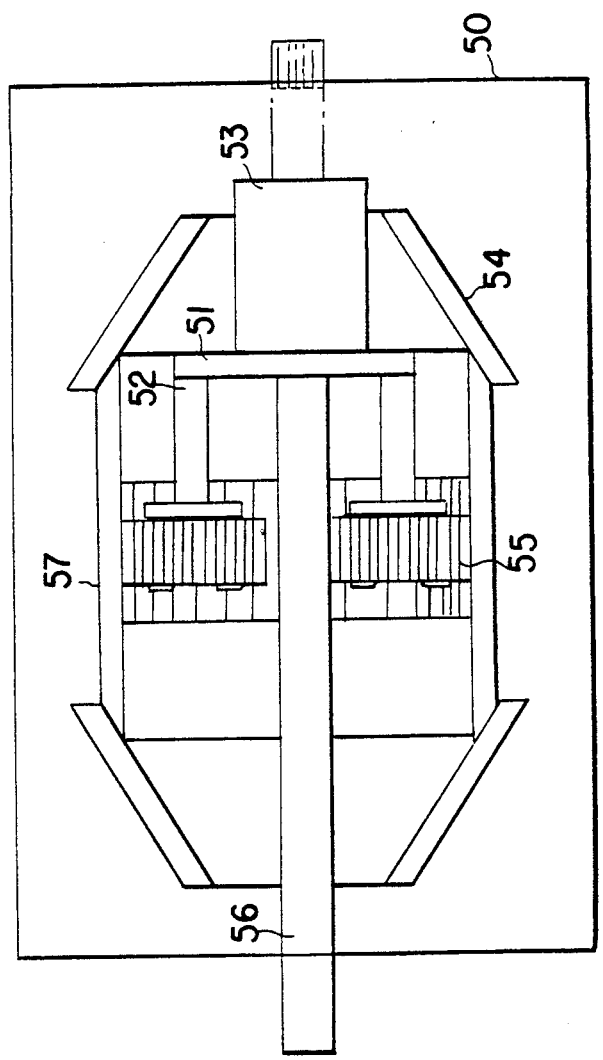
FIG. 2 is a front view of an inverted variable planetary gear.

The invention may be attained by providing a variable inverted pulley that is supported by an external mechanism that located the pulley halves. Power transfer takes place via either a combination of variable pully located inside the variable pulley, working together with fixed planet wheels, or with innovative variable span planet mechanisms working together with a traditional sun wheel or a variable pulley in place of the traditional sun.

In this assemblage, power transfer takes place by friction contact of the planets to the sun and ring mechanisms. The action of the various variable mechanisms is coordinated to preserve contact over the various diameter changes.

Further, the invention may be attained by providing a variable inverted circumference mechanism consisting of a variable inverted pulley that is supported by an external mechanism that located the inverted pulley halves, and provides storage for flexible surface. The surface is encircled by the inverted pulley halves and is held tightly thereto by a novel band expansion mechanism, thereby eliminating any slackness in the surface, as well as eliminating kinking of the surface into the hollow center. Power transfer takes place via either a combination of a variable circumference mechanism located inside the variable inverted circumference mechanism, working together with fixed planet mechanism, or with innovative variable-span planet mechanisms working together with a traditional sun mechanism or a variable circumference mechanism in place of the traditional sun. Any number of surfaces can be used on the various mechanisms, including, but not limited to, clogs, gear teeth, or multiple-V surfaces. Friction or mechanical interlocking power transfer results depending on the surface used.

In this assemblage, one end of the surface is permanently attached to the inverted pulley halves at slots in the pulley halves, or to a guide member riding in the slots. The other end of the surface is attached to a tensioning mechanism located in the external storage area. As the pulley halves move toward each other, the slack is taken up by the tensioning mechanism, perhaps together with a tensioning/locking mechanism located on the guide assembly, Since the pulley halves are inverted, they tend to compress the surface rather than expand it. To apply circumferential pressure to keep the surface in contact with the inverted pully halves. They operated cooperatively with the inverted pulley halves to trap the surface between the bands and the inverted pulley halves, with the inverted pulley halves on the outside. The excess bands are stored in separate parts of the external storage area, and the compression mechanism are located on the sides of the guide assembly. When the inverted pulley halves move outwardly, the bands are simultaneously pushed out by the compression mechanism, causing the surface to maintain contact with the inverted pulley halves, and thereby urging stored sections of the surface out of the storage area and onto there inverted pulley halves.

The variable inverted circumference mechanism has its power transfer on the inside, like the aforementioned variable inverted pulley. As a result, one of the planetary arrangements used for the variable inverted pulley is necessary. Power transfer is by friction or mechanical interlock according to the surface used.

Further sill, the invention may be attained by providing a flexible surface with a guide member and locking mechanism to determine the circumference, band and compression mechanisms to push out on the surface and form the circumference, and locating mechanisms to support the bands. The locating mechanisms could be short channel sections that snugly fit a band, attached to a linear screw mechanism cooperatively operated with the band compression mechanisms. The excess surface and excess band sections would be stored inside, similar to the variable circumference mechanism using variable pulleys.

Finally, the invention may be attained by providing an inverted variable circumference mechanism consisting of a flexible surface with guide member and locking mechanism to determine the circumference, band and compression mechanisms to push in on the surface and form the circumference, and locating mechanisms to support the band. The locating mechanisms could be short channel sections that snugly fit a band, attached to a linear screw mechanism cooperatively operated with the band compression mechanisms. The excess surface and excess band sections would be stored outside, similar to the variable circumference mechanism using inverted pulleys.

As can be seen from FIG. 1, there is generally provided a variable planetary gear comprising a variable circumference mechanism for a variable sun gear wherein frusto-conical halves 40 are disposed in a carrier 41 containing a bearing 42. The surface 43 of the carrier covers hub 40A, and a ring gear 44 is disposed in contact-relationship with planet 45, which in turn is in contact relationship with a variable span planet 46.

In the front view of the inverted variable planetary gear shown in Fir. 2, there is a holding or storage compartment 50 housing the gear. A connection plate 51 joins carrier arm 52 with axle 53, which is disposed between inverted pulley 54. Variable planets 55 are disposed around solid hub 56, and the planets and the hub are contained by surface wall 57, which is in contact-relationship with the inverted pulleys.

FIG. 3 shows a side view of the inverted planetary gear, with variable span planets 60A, wherein a hollow hub 60 is surrounded by a variable contact surface 61 on which there is a guide member 62. An outer ring gear 63 and an inner planet carrier 64 are separated by a first space $S_1$, and the planet carrier and variable pully cone 65 are separated by a second space $S_2$.

While the present invention has been set forth with respect to the particular embodiments herein, it can be readily seen by those having ordinary skill in the art that numerous modifications are possible. Therefore, such modifications would easily fall within the scope of the invention claimed.

What is claimed is:

1. A variable diameter pulley drive mechanism, comprising:
   a splined, rotably supported, hollow, axle member having one or more longitudinally extending openings;
   a variable diameter traction element carried by said axle member, wherein said traction element includes a pair of outwardly biased frusto-conical pulley members capable of relative axial movement along said axle member;
   one or more flexible engaging elements for positively contacting power transfer means riding upon said traction assembly; and
   tensioning means operatively connected to said engaging element, whereby stress exerted upon said tensioning means causes said engaging element to retract into said axle member through said longitudinal opening, so that said flexible engaging element is tightly carried by said traction element through every degree of variation, said frusto-conical pulley halves having one or more slots to allow storage of unused portions of the engaging elements;

said frusto-conical halves are disposed in a carrier; said carrier contains bearings on which ring gears are disposed in contact-relationship with planets; and said planets are disposed in contact-relationship with variable span planets.

2. A variable diameter pulley drive mechanism of claim 1, wherein said frusto-conical halves are inverted; a connection plate joins a carrier are with said axle;

said connection plate joined to said carrier are is disposed in contact relationship between said inverted frusto-conical halves; and said planets are disposed about a solid hub.

3. A variable diameter pulley drive mechanism of claim 1, wherein said frusto-conical halves are inverted; said hub is hollow and contains a guide member therein; on outer ring gear and an inner planet carrier are separated by a first space; and a planet carrier and variable pulley cone 65 are separated by a second space.

* * * * *